(12) United States Patent
Nakamura (10) Patent No.: US 10,397,774 B2
(45) Date of Patent: Aug. 27, 2019

(54) INFORMATION PROCESSING APPARATUS, CONTROL METHOD, AND PROGRAM

(71) Applicant: CANON KABUSHIKI KAISHA, Tokyo (JP)

(72) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/888,502

(22) Filed: Feb. 5, 2018

(65) Prior Publication Data

US 2018/0234840 A1 Aug. 16, 2018

(30) Foreign Application Priority Data

Feb. 10, 2017 (JP) .................................. 2017-023622

(51) Int. Cl.

| H04N 1/00 | (2006.01) |
|---|---|
| H04W 8/22 | (2009.01) |
| H04W 8/26 | (2009.01) |
| H04W 24/02 | (2009.01) |
| H04W 48/16 | (2009.01) |
| H04W 84/12 | (2009.01) |
| H04W 48/12 | (2009.01) |

(52) U.S. Cl.
CPC .............. *H04W 8/265* (2013.01); *H04W 8/22* (2013.01); *H04W 24/02* (2013.01); *H04W 48/16* (2013.01); *H04N 1/00973* (2013.01); *H04W 48/12* (2013.01); *H04W 84/12* (2013.01)

(58) Field of Classification Search
CPC ..... H04W 48/18; H04W 48/10; H04W 8/005; H04W 8/22
See application file for complete search history.

(56) References Cited

U.S. PATENT DOCUMENTS

| 2011/0058536 A1* | 3/2011 | Tsuchiya ............... H04W 48/18 370/338 |
|---|---|---|
| 2013/0128784 A1* | 5/2013 | Nakao ................. H04L 12/6418 370/310 |
| 2015/0312794 A1* | 10/2015 | Matsuda ............... G06F 3/1203 370/230 |

FOREIGN PATENT DOCUMENTS

JP 2010-98765 A 4/2010

* cited by examiner

*Primary Examiner* — Diane D Mizrahi
(74) *Attorney, Agent, or Firm* — Canon U.S.A., Inc. IP Division (57) ABSTRACT

An information processing apparatus activates an access point for executing direct wireless communication with a communication terminal through a SSID complying with a specific setting method from among a plurality of setting methods upon condition that a network setting of the information processing apparatus is executed. The information processing apparatus also activates an access point through an SSID complying with a different setting method, based on a user operation for executing setting of the information processing apparatus through a setting method different from the specific setting method from among the plurality of setting methods wherein a network setting to be used by the information processing apparatus is received from the communication terminal through the direct wireless communication.

22 Claims, 7 Drawing Sheets

LANGUAGE SETTING

| Language |
|---|
| English |
| French |
| Japanese |

~400

⇩

DATE/TIME SETTING

CURRENT DATE/TIME SETTING

| 20 -- | YEAR |
| --/-- | MONTH/DATE |
| --:-- | (0:00~12:59) |
| AM | PM |

| < | > |
| 1 | 2 | 3 | + |
| 4 | 5 | 6 |
| 7 | 8 | 9 |
| C | 0 | - |

CONFIRM

~401

⇩

WIRELESS NETWORK SETTING

WIRELESS LAN SETTING

SSID SETTING
WPS PUSH-BUTTON METHOD
WPS PIN CODE METHOD
REMOTE WIRELESS SETTING METHOD 1
REMOTE WIRELESS SETTING METHOD 2
REMOTE WIRELESS SETTING METHOD 3

STAND READY IN SETTING METHOD 1 (Key1234) [NEXT]

~402

FIG. 5A  WIRELESS NETWORK SETTING

| WIRELESS LAN SETTING |
| --- |
| SSID SETTING |
| WPS PUSH-BUTTON METHOD |
| WPS PIN CODE METHOD |
| REMOTE WIRELESS SETTING METHOD 1 |
| REMOTE WIRELESS SETTING METHOD 2 |
| REMOTE WIRELESS SETTING METHOD 3 |

510 = {SSID SETTING, WPS PUSH-BUTTON METHOD, WPS PIN CODE METHOD}
511 = {REMOTE WIRELESS SETTING METHOD 1, 2, 3}
501

513 — STAND READY IN SETTING METHOD 1 (Key1234) [NEXT] — 512

FIG. 5B  DETAILED SCREEN OF REMOTE WIRELESS SETTING METHOD 1

PLEASE PERFORM CONNECTION OPERATION THROUGH A TERMINAL SUPPORTING THE REMOTE WIRELESS SETTING METHOD 1.
- SSID
  XX-PrinterSetting1234
- NETWORK KEY
  1234

521, 522, 502
STAND READY IN SETTING METHOD 1 (Key1234) [RETURN] — 523

FIG. 5C  DETAILED SCREEN OF REMOTE WIRELESS SETTING METHOD 2

PLEASE PERFORM CONNECTION OPERATION THROUGH A TERMINAL SUPPORTING THE REMOTE WIRELESS SETTING METHOD 2.
- SSID
  YY-Printer
- NETWORK KEY
  WITHOUT ENCRYPTION 531, 503
STAND READY IN SETTING METHOD 2 [RETURN]

FIG. 6B

INFORMATION PROCESSING APPARATUS, CONTROL METHOD, AND PROGRAM

BACKGROUND

Field

The present disclosure relates to an information processing apparatus that executes setting in cooperation with an external apparatus.

Description of the Related Art

In recent years, various information processing apparatuses have been connected to a wireless network. Each of the information processing apparatuses has to operate as a wireless client to connect to a (wireless) base station called as an access point (AP) in order to participate in a home-use or office-use wireless network.

Recently, various methods of easily executing an initial setting that includes a setting of connecting an information processing apparatus, such as a printing apparatus, to the wireless network have been provided. Japanese Patent Application Laid-Open No. 2010-98765 discusses a method of executing a network setting of the information processing apparatus via an operation unit of a communication terminal different from the information processing apparatus. The information processing apparatus described in Japanese Patent Application Laid-Open No. 2010-98765 activates a software AP for wirelessly communicating with a communication terminal without interposing an external AP, and receives a network setting from the communication terminal. The communication terminal displays a list of APs found by a searching operation on the operation unit of the communication terminal. From among the list of APs displayed on the operation unit of the communication terminal, a user selects an AP to which the information processing apparatus should connect. The communication terminal transmits information about the selected AP to the information processing apparatus. The information processing apparatus can execute a setting of a wireless network of a connection destination based on the information about the AP received from the communication terminal.

SUMMARY

According to an aspect of the present disclosure, an information processing apparatus includes an operation unit, a memory device configured to store a set of instructions, and at least one processor when executing the instructions, causes the information processing apparatus to activate an access point for executing direct wireless communication with a communication terminal through a predetermined service set identifier (SSID) complying with a specific setting method from among a plurality of setting methods upon condition that a network setting of the information processing apparatus is executed, and activate an access point through an SSID complying with a different setting method, based on a user operation for executing setting of the information processing apparatus through a setting method different from the specific setting method from among the plurality of setting methods, wherein the user operation is received via the operation unit, and wherein a network setting to be used by the information processing apparatus is received from the communication terminal through the direct wireless communication.

Further features will become apparent from the following description of exemplary embodiments with reference to the attached drawings.

DESCRIPTION OF THE EMBODIMENTS

There is a case where an information processing apparatus operating as a wireless client activates a software AP and cooperates with a communication terminal to execute an initial setting through direct wireless communication using the software AP. A method of the above-described initial setting has been developed in various standards through a plurality of standard-setting organizations. The setting method of executing the initial setting by making an information processing apparatus cooperate with a communication terminal can also be developed by a vendor of the information processing apparatus as a dedicated standard thereof. In the dedicated standard, in order to make it possible to execute the initial setting dedicated to the vendor's information processing apparatus, initial settings other than a network setting can also be executable.

In order to execute the initial setting cooperating with the communication terminal through the above-described setting method, the information processing apparatus has to activate a software AP complying with a standard of that setting method. For example, the software AP has to be activated in such a setting that a service set identifier (SSID) for identifying the software AP and an encryption method thereof comply with the standard.

In the present exemplary embodiment, the information processing apparatus supports the above-described plurality of setting methods. The information processing apparatus displays a plurality of usable setting methods supported thereby as options, and activates a software AP complying with a standard of the selected setting method based on selection of the user. Because a user who is not familiar with the network technique can have difficulty in selecting a usable setting method from among the plurality of options, the information processing apparatus further executes the following control.

The information processing apparatus preferentially activates an access point complying with a predetermined setting method to prompt the user to execute a setting through the predetermined setting method, while also enabling the user to switch the setting method to another setting method through a user operation. The information processing apparatus activates the access point for direct wireless communication through a predetermined setting, and enables the user to perform a setting using direct wireless communication through the predetermined setting method via the communication terminal, while also enabling the user to switch the setting method to another setting method through a user operation.

Hereinafter, an exemplary embodiment embodying the present disclosure will be described with reference to the appended drawings. The embodiments described hereinafter are not intended to limit the scope of the appended claims, and not all of the combinations of features described in the exemplary embodiments are required.

Figure 1:
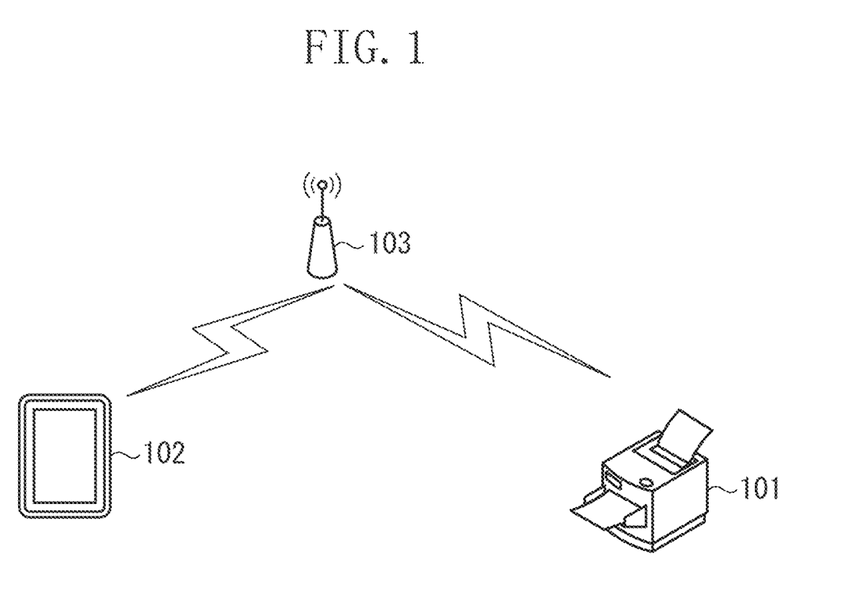
FIG. 1 is a diagram illustrating a general configuration of a system.

First, a configuration of a system according to a first exemplary embodiment of the present invention will be described with reference to FIG. 1. The system according to the present exemplary embodiment includes a multifunction peripheral (MFP) 101, a communication terminal 102, and an access point (AP) 103.

The communication terminal 102 can execute wireless communication based on a standard of the Electrical and Electronics Engineers (IEEE) 802.11 (hereinafter, referred to as "IEEE 802.11 standard"). The user inputs a service set identifier (SSID) and a security key for connecting to the AP 103 to the communication terminal 102, so that the communication terminal 102 can connect to the network provided by the AP 103.

The MFP 101 includes a reading function of reading an image on a document. The MFP 101 also includes a printing function of receiving print data via a network and printing an image on a sheet. When the SSID and the security key for connecting to the AP 103 is set as a wireless network setting of the MFP 101, the communication terminal 102 and the MFP 101 can execute wireless communication via the AP 103. Hereinafter, in the present exemplary embodiment, a mode in which the communication terminal 102 and the MFP 101 communicate with each other via the AP 103 is called as "infrastructure wireless communication".

The communication terminal 102 communicates with the MFP 101 via the AP 103. The communication terminal 102 can transmit print data to the MFP 101 via the AP 103. The MFP 101 receives the print data and executes printing based on the print data.

The MFP 101 can activate a software AP to wirelessly communicate with the communication terminal 102 without interposing a relay apparatus, such as the AP 103. If the MFP 101 activates the software AP, the communication terminal 102 can connect to the software AP provided by the MFP 101. The user inputs connection information, such as an SSID and a security key, for connecting to the software AP activated by the MFP 101 to the communication terminal 102. The communication terminal 102 connects to the software AP provided by the MFP 101 based on the connection information input by the user. The communication terminal 102 that connected to the software AP provided by the MFP 101 can directly and wirelessly communicate with the MFP 101 without interposing a relay apparatus such as the AP 103.

Hereinafter, in the present exemplary embodiment, a mode in which the communication terminal 102 wirelessly communicates with the MFP 101 without interposing a relay apparatus, such as the AP 103, is called as "direct wireless communication". The communication terminal 102 can communicate with the MFP 101 through infrastructure wireless communication or direct wireless communication.

<Communication Terminal>

First, the communication terminal 102 will be described. The communication terminal 102 is an information processing apparatus, such as a smartphone, a tablet terminal, or a personal computer (PC), in which applications for various purposes are installed. In the present exemplary embodiment, a plurality of setting applications that provide functions of executing a network setting of an information processing apparatus existing in a periphery of the communication terminal 102 based on a predetermined standard is installed in the communication terminal 102.

A printing application that provides a printing function for transmitting print data to the MFP 101 and executing printing is installed in the communication terminal 102. The printing application enables the communication terminal 102 to transmit print data to the MFP 101 through infrastructure wireless communication or direct wireless communication to cause the MFP 101 to execute printing.

In the present exemplary embodiment, while a setting application and a printing application are provided as individual applications, the exemplary embodiment is not limited thereto. For example, an operating system (OS) that generally controls the communication terminal 102 can provide the above-described printing function and the setting function as functions of the OS. One application including a printing function or a setting function cooperating with the MFP 101 can be provided.

<MFP>

Figure 2:
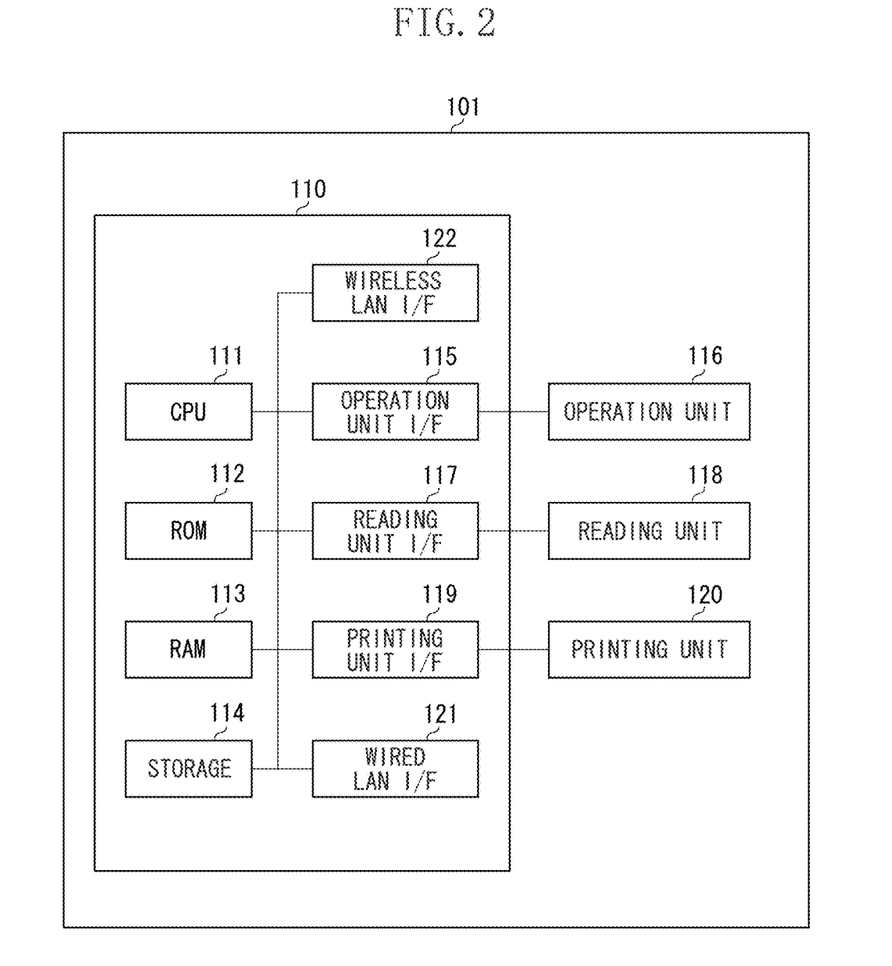
FIG. 2 is a block diagram illustrating a hardware configuration of a multifunction peripheral (MFP).

The MFP 101 will now be described. FIG. 2 is a block diagram illustrating a hardware configuration of the MFP 101. A control unit 110 that includes a central processing unit (CPU) 111 controls the entire operation of the MFP 101. The CPU 111 reads a control program stored in a read only memory (ROM) 112 or a storage 114 to execute various kinds of control, such as printing control and reading control. The ROM 112 stores a control program executable by the CPU 111. A random access memory (RAM) 113 is a main memory of the CPU 111, and used as a work area or a temporary storage area for loading commands of various control programs. The storage 114 stores print data, image data, various programs and various kinds of setting information. In the present exemplary embodiment, while a flash disk such as a solid state drive (SSD) is assumed as the storage 114, the storage 114 can be an auxiliary storage device, such as a hard disk drive (HDD).

In the MFP 101 of the present exemplary embodiment, while one CPU 111 uses one memory (RAM 113) to execute the processing illustrated in the below-described flowchart, the configuration is not limited to the above. For example, a plurality of processors, RAMS, ROMs, and storages can cooperatively execute the processing illustrated in the flowchart described below. A part of the processing can be executed by a hardware circuit such as an application specific integrated circuit (ASIC) or a field-programmable gate array (FPGA).

An operation unit interface (I/F) 115 connects an operation unit 116 to the control unit 110. The operation unit 116 includes a liquid crystal display unit including a touch panel function and various hard keys, and functions as a display unit for displaying information or a receiving unit for receiving a user instruction.

A reading unit I/F 117 connects a reading unit 118 to the control unit 110. The reading unit 118 reads a document and generates a read image. The generated read image is transmitted externally from the MFP 101 via a network, or used for executing printing. A printing unit I/F 119 connects a printing unit 120 to the control unit 110. The printing unit 120 prints an image on a sheet based on externally received print data or the read image.

Further, the control unit 110 is connected to a network (not illustrated) via a wired local area network (LAN) I/F 121. The wired LAN I/F 121 transmits an image or information to an external apparatus connected to the network (not illustrated) and receives print data or information from the external apparatus connected to the network.

The control unit 110 includes a wireless LAN I/F 122. The wireless LAN I/F 122 provides a wireless client function enabling the MFP 101 to connect to an external AP to execute wireless communication and a software AP function enabling the MFP 101 to operate as an AP.

The wireless client function of the MFP 101 is operated when the infrastructure mode is ON. When the infrastructure mode is ON, the MFP 101 connects to an external access point based on the wireless network setting stored in the MFP 101. For example, if the SSID or the security key for connecting to the AP 103 is set as the wireless network setting, the MFP 101 can wirelessly communicate with another apparatus connected to the AP 103 via the AP 103.

The software AP is activated when the access point mode is ON. If the user sets the access point mode to ON, the MFP 101 activates the software AP and operates as an AP to which the external apparatus is connectable. The SSID and the security key for connecting to the software AP is displayed on the operation unit 116 of the MFP 101 based on a user operation.

In addition, the MFP 101 of the present exemplary embodiment can activate a single software AP. The MFP 101 of the present exemplary embodiment can concurrently operate the wireless client function and the software AP function. In other words, while the MFP 101 physically includes one wireless network interface, the MFP 101 logically includes two network interfaces, i.e., an interface used when operating as a software AP and an interface used when connecting to the external AP as a wireless client. Herein, for the sake of description, an interface for transmitting and receiving data to/from the external AP through an infrastructure mode is referred to as "wlan0". An interface for transmitting and receiving data via the software AP is referred to as "wlan1". The CPU 111 cooperates with the wireless LAN I/F 122 to make the I/F "wlan1" operate as a software AP.

In the present exemplary embodiment, while functions of the wireless client and the software AP can be operated simultaneously, the configuration is not limited thereto. For example, if the wireless LAN I/F 122 can only operate as any one of the functions of the wireless client and the software AP, the user can operate the wireless LAN I/F 122 by selecting any one of the modes through exclusive processing. In this case, for example, the access point mode is OFF if the infrastructure wireless communication is to be executed by setting the infrastructure mode to ON. When the access point mode is OFF, the MFP 101 stops the operation of the software AP and makes the wireless LAN I/F 122 operate as the wireless client. The infrastructure mode is OFF if the software AP is to be activated by setting the access point mode to ON. When the infrastructure mode is OFF, the MFP 101 disconnects the connection with the external access point and makes the wireless LAN I/F 122 operate as the software AP.

In the present exemplary embodiment, while the MFP 101 is described as an example of the information processing apparatus that cooperates with the communication terminal 102, the exemplary embodiment is not limited thereto. Additional exemplary embodiments are applicable to various devices that activate a software AP in order to cooperate with other devices. For example, a single function peripheral (SFP), such as a scanner apparatus or a printer apparatus, a digital camera, a television, a refrigerator, and an information processing apparatus such as a digital signage apparatus or a wearable device are applicable.

The MFP 101 also includes a function of executing the initial setting through direct wireless communication via the software AP in cooperation with the communication terminal 102. The above-described initial setting method has been developed in various standards through a plurality of standard-setting organizations.

In order to enable a user to use a desired standard when the initial setting is executed in cooperation with the communication terminal 102, the MFP 101 of the present exemplary embodiment supports a plurality of setting methods. The MFP 101 also supports a setting method complying with a standard dedicated to a vendor, in which the initial setting is executed by cooperating an information processing apparatus with a communication terminal. In the setting method complying with the dedicated standard, initial settings other than the network setting dedicated to the vendor's information processing apparatus can also be executed. For example, the MFP 101 can receive a wired network setting as the initial setting. For example, the MFP 101 can receive a registration of a transmission destination (i.e., an e-mail address or a facsimile number) with respect to an address book used for a transmission function for transmitting an image external to the MFP 101.

Herein, in order to execute the initial setting in cooperation with the communication terminal by using a setting method, the information processing apparatus has to activate a software AP complying with a standard of that setting method. For example, the software AP has to be activated in a setting in which an SSID for identifying the software AP and an encryption method thereof comply with the standard.

Herein, it is assumed that the information processing apparatus supports a plurality of setting methods. In this case, the information processing apparatus displays a plurality of usable setting methods supported thereby as the options and activates a software AP complying with a standard of a selected setting method based on selection of the user.

However, a user who is not familiar with the network technique can have difficulty in appropriately selecting a setting method usable for the communication terminal owned by the user. It is assumed that convenience of the user will be increased if a standard dedicated to the vendor can be preferentially used.

In consideration of the above situation, in the present exemplary embodiment, when the initial setting is to be executed, the information processing apparatus preferentially activates an access point complying with a recommended setting method to prompt the user to use the recommended setting method, while enabling the user to switch the setting method to another setting method through a user operation.

Figure 3:
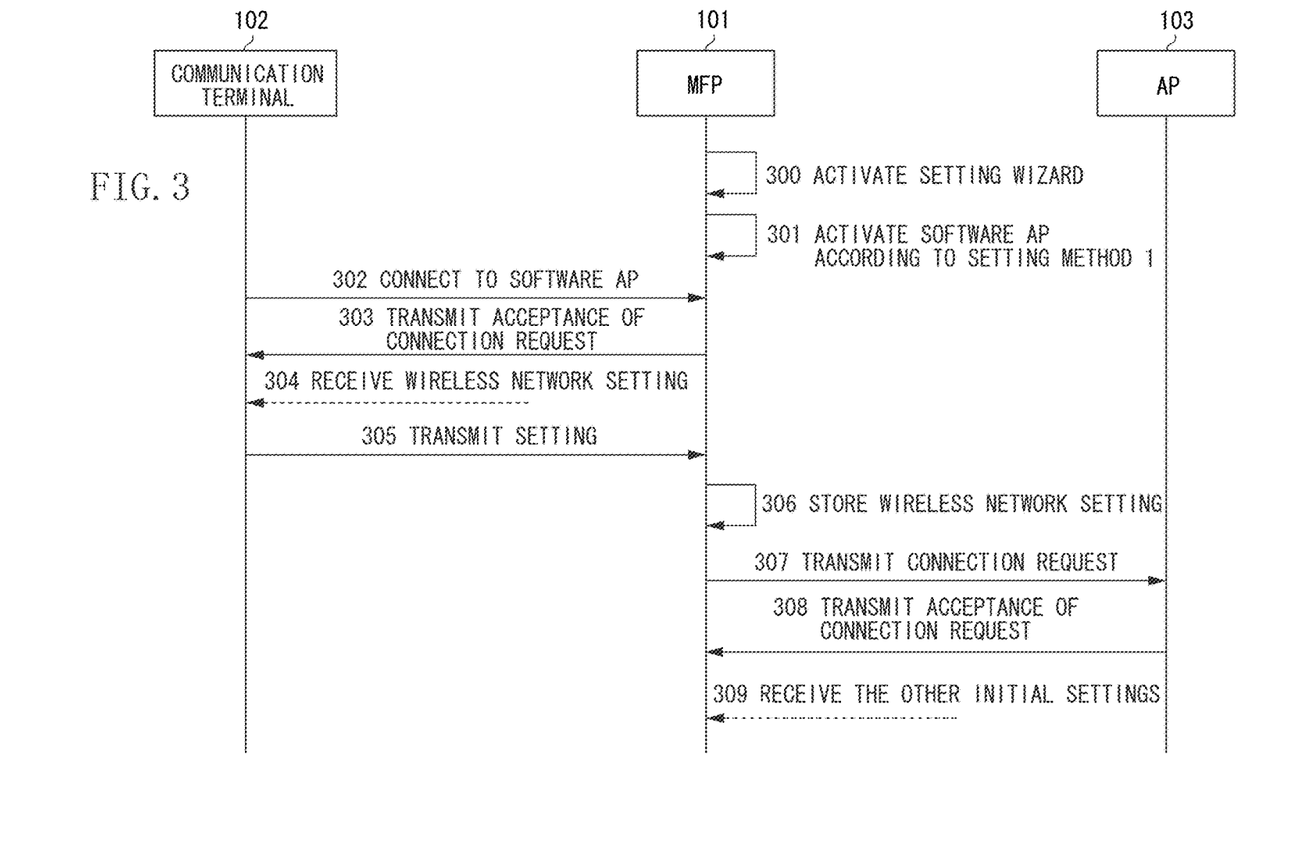
FIG. 3 is a sequence diagram illustrating cooperation between the MFP and a communication terminal.

A series of sequence for executing the initial setting in cooperation with the communication terminal 102 will now be described. FIG. 3 is a sequence diagram illustrating a series of sequence for the MFP 101 to execute the initial setting by receiving data from the communication terminal 102. The sequence illustrated in FIG. 3 is executed when power is initially supplied to the MFP 101 (i.e., power is supplied after factory shipment). The initial setting executed through a setting wizard can be also executed through a normal setting menu.

Figure 4:
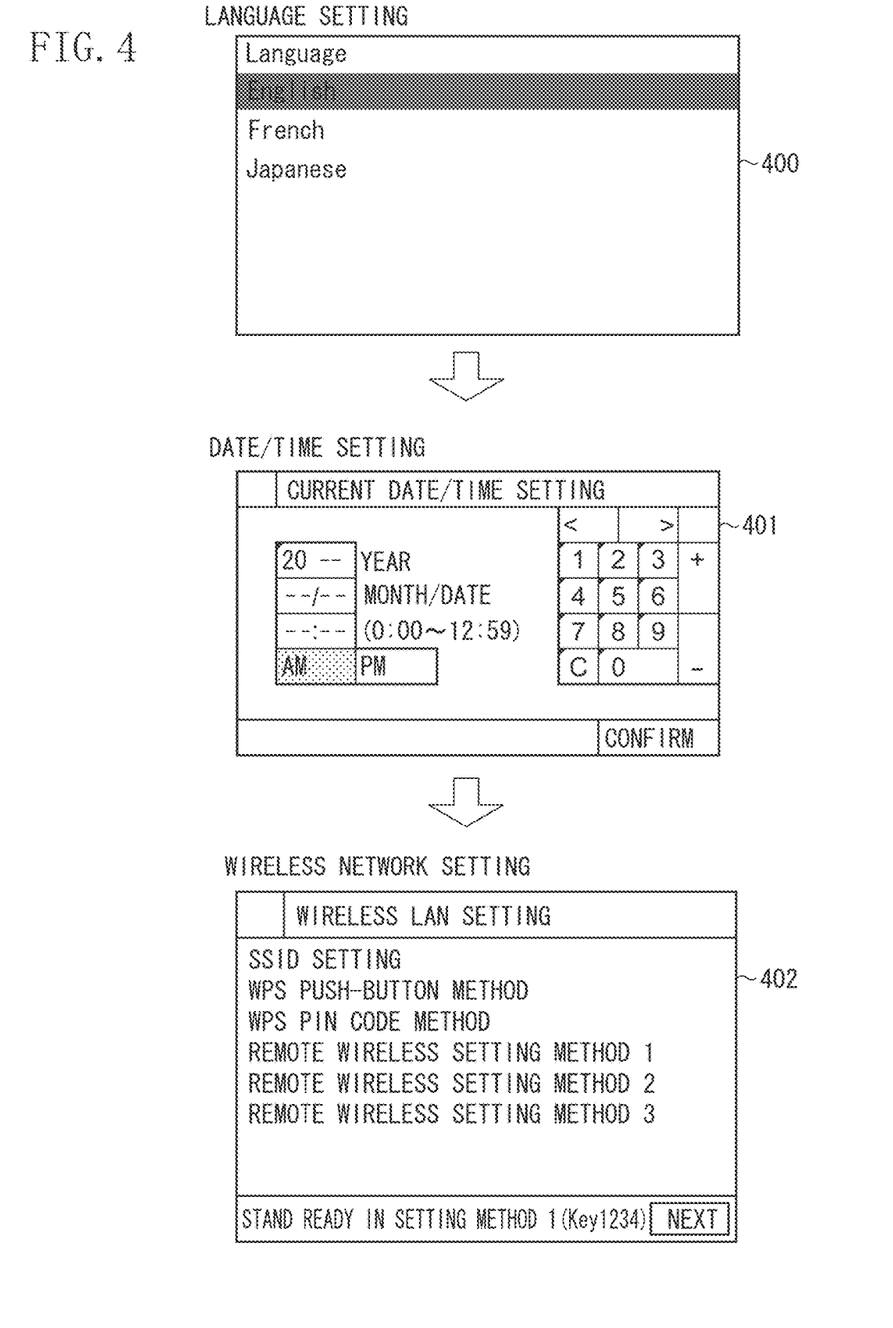
FIG. 4 is a diagram illustrating screens to be displayed on an operation unit of the MFP.

When power is supplied to cause the MFP 101 to be brought into a usable state, in step 300, the MFP 101 displays an initial setting wizard on the operation unit 116. The initial setting wizard provides a display language setting, a date/time setting, and a wireless network setting to the user. FIG. 4 is a diagram illustrating an example of a screen displayed on the operation unit 116 of the MFP 101 in the initial setting wizard and transition thereof. A screen 400 illustrates a screen for receiving a display language setting from the user, and a screen 401 illustrates a screen for receiving a date/time setting from the user. A screen 402 illustrates a screen for receiving a wireless network setting from the user (details will be described below in FIG. 5).

In the present exemplary embodiment, for example, setting processing is executed in the order of the display language setting, the date/time setting, and the wireless network setting. Through the operation performed via the operation unit 116, the MFP 101 executes the wireless network setting after executing the display language setting and the date/time setting. In the present exemplary embodiment, an order of the initial processing and the items to be set through the initial setting are not limited to the above. The present exemplary embodiment is applicable to an information processing apparatus that executes a setting of at least a wireless network as the initial setting at a time of initial activation.

In step 301, when the screen 402 for executing the setting processing of the wireless network is displayed, the MFP 101 activates a software AP based on a standard of a specific setting method (i.e., remote wireless setting method 1 in FIG. 4) from among the setting methods supported thereby. Accordingly, the MFP 101 can automatically activate the software AP of a setting based on the standard of the specific setting method before displaying the setting screen of the wireless network. In addition, the user can also execute the wireless network setting through another setting method via the screen 402. In this case, the user selects a desired setting method from among a plurality of options displayed on the screen 402 to execute the setting through a desired setting method.

In step 302, a setting application of the communication terminal 102 connects to the software AP of the MFP 101. An SSID and a security key of the software AP activated by the MFP 101 are specified as the connection information used for connection. For example, the setting application searches for APs in a particular vicinity and displays a list of APs complying with the standard. The user specifies an AP of the information processing apparatus on which the user would like to execute the network setting from among the list of APs displayed thereon. The security key is input by the user. In addition, if the MFP 101 activates a software AP which does not require a security key for connection (i.e., a software AP which does not require encryption), input of a security key is omitted.

In step 303, the MFP 101 receives a connection request for connecting to the software AP from the communication terminal 102 and executes authentication based on connection information to transmit acceptance of the connection request to the communication terminal 102. If the authentication fails because of unconformity of the security key, the MFP 101 waits for a retry of the connection request.

In step 304, the setting application of the communication terminal 102 receives a wireless network setting such as an SSID or a network key of the AP (AP 103) to which the MFP 101 should connect. In addition, the SSID and the network key of the AP 103 can be input by the user or can be selected by the user from a displayed list of APs the communication terminal 102 has connected in the past.

In step 305, the communication terminal 102 transmits the wireless network setting received in step 304 to the MFP 101. In step 306, the MFP 101 receives the wireless network setting from the communication terminal 102 and stores the received setting in the storage 114 as the wireless network setting of the device. In step 307, the MFP 101 transmits a connection request to the AP 103 by using the wireless network setting stored in step 306. In step 308, the AP 103 receives the connection request, executes authentication, and transmits acceptance of the connection request to the MFP 101.

When the network setting is completed, the MFP 101 shifts the screen displayed on the operation unit 116 to a screen of another initial setting and receives another initial setting via the operation unit 116.

When the setting executed through the setting wizard is completed, the MFP 101 is brought into a state where the user can use copying, printing and transmission functions. The MFP 101 also includes a factory-reset function for resetting (initializing) the MFP 101 to a setting at a time of factory shipment. If the factory-reset operation is performed through the setting menu, the MFP 101 initializes a device setting and displays a screen of the setting wizard illustrated in FIG. 4.

Through the above-described processing, an initial setting including a setting for connecting the information processing apparatus, such as a printing apparatus, to a wireless network can be easily performed.

Figure 5A:
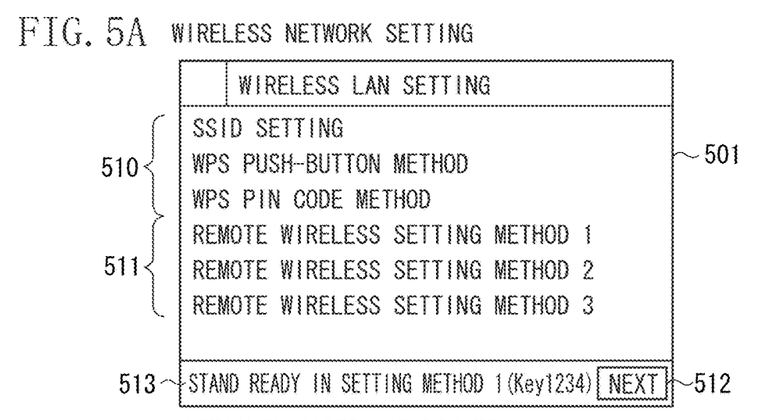
FIGS. 5A, 5B, and 5C are diagrams illustrating screens to be displayed on the operation unit of the MFP.
Figure 5B:
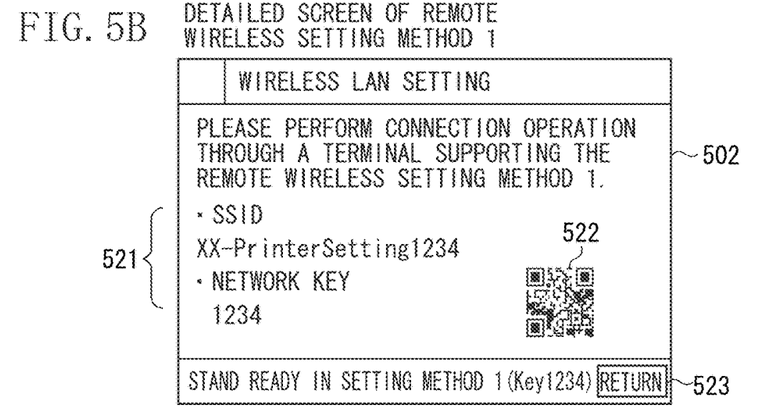
Figure 5C:
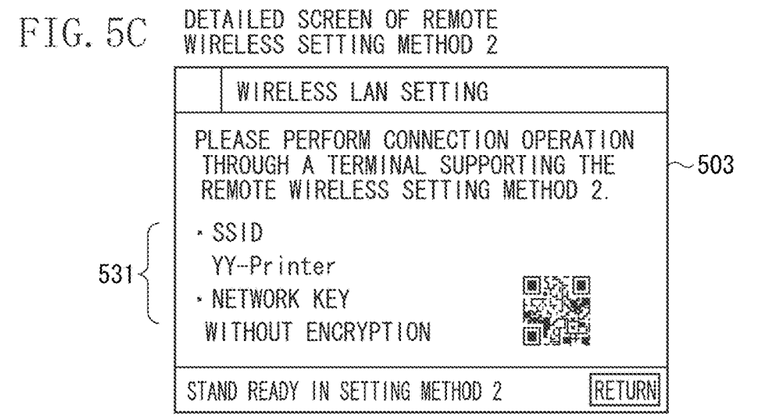

The wireless network setting of the MFP 101 will be described in more detail with reference to FIGS. 5A to 5C. FIGS. 5A to 5C are diagrams illustrating examples of screens displayed on the operation unit 116 of the MFP 101. A screen 501 in FIG. 5A illustrates a selection screen for receiving the wireless network setting. Options that enable the user to select a wireless network setting method supported by the MFP 101 are displayed on the screen 501 in a selectable state. The user can select a desired method from among the plurality of setting methods displayed on the screen 501 and execute the wireless network setting through the selected setting method.

Options 510 are setting methods of executing the wireless network setting via the operation unit 116 of the MFP 101. If the user selects an option "SSID setting", the MFP 101 shifts the screen 501 to an input screen (not illustrated). The user can manually set the SSID and the security key of the AP to which the MFP 101 connects through the input screen. "WPS push-button method" and "WPS personal identification number (PIN) code method" are options for executing the wireless network setting according to a specification of the Wi-Fi Protected Setup™ (WPS). In the WPS push-button method, the AP and the MFP 101 communicate with each other based on a predetermined sequence to execute the wireless network setting when both of a push button provided on the AP and a push button displayed on a panel of the MFP 101 are pressed. In the WPS PIN code method, the AP and the MFP 101 communicate with each other based on a predetermined sequence to execute the wireless network setting when a PIN code of the AP is input to the operation unit 116.

Options 511 are setting methods in which the MFP 101 activates the software AP and exchanges information with the communication terminal 102 through direct wireless communication to execute the wireless network setting of the MFP 101. The MFP 101 of the present exemplary embodiment supports three setting methods, i.e., remote wireless setting methods 1 to 3. In the present exemplary embodiment, while names of the setting methods are displayed, the exemplary embodiment is not limited thereto. For example, if the OS of the communication terminal 102 includes a wireless network setting function complying with a predetermined standard as a basic function thereof, a name of the OS installed on the communication terminal 102 or a model name thereof can be displayed. In this case, the user can be clearly informed whether the initial setting of the MFP 101 can be executed through the communication terminal 102 owned by the user.

As illustrated in FIG. 3, the MFP 101 of the present exemplary embodiment preferentially activates the software AP to be used for the remote wireless setting method 1 (hereinafter, also referred to as "setting method 1"). In addition, in order to make respective setting methods using direct wireless communication be recognizable, there is a case where a specification thereof stipulates that the SSID should include a specific identifier. Herein, it is assumed that a specification of the setting method 1 stipulates that the SSID should include an identifier "XX" at a head portion thereof. In this case, for example, the MFP 101 activates a software AP having the SSID such as "XX-PrinterSetting1234".

Information 513 is information for notifying the user that the MFP 101 stands ready to receive the initial setting from an external communication terminal through the setting method 1. A security key necessary for connecting to the software AP of the MFP 101 is also displayed as the information 513. As described above, by displaying the information 513, the user can be notified that the initial setting of the wireless network can be executed by the communication terminal 102 through the setting method 1. A next key 512 is used when the user skips the initial setting of the wireless network and advances the processing to the next setting processing. If the user selects the next key 512 without ending the wireless network setting, a confirmation screen for requesting a user's confirmation is displayed. A message "WIRELESS NETWORK SETTING HAS NOT BEEN COMPLETED. WOULD YOU LIKE TO SKIP THE SETTING?", an OK key, and a cancel key are displayed on the confirmation screen. The user can confirm whether to skip the wireless network setting via the confirmation screen. If the operation of skipping the initial setting of the wireless network is performed, the MFP 101 stops the activated software AP and advances the processing to next setting processing.

If the user selects a display region of the information 513 or an option "REMOTE WIRELESS SETTING METHOD 1", the MFP 101 shifts the screen displayed on the operation unit 116 to a screen 502 illustrated in FIG. 5B. The screen 502 is a screen for details of the setting method 1, and information 521 necessary for connecting the communication terminal 102 to the software AP is displayed thereon. A uniform resource locator (URL) enabling the communication terminal 102 to access a site of an application that supports the setting method 1 is stored in a two-dimensional barcode 522 displayed on the screen 502. The user can use a camera (not illustrated) provided on the communication terminal 102 to read the two-dimensional barcode 522 and access the site of the application supporting the setting method 1. A return key 523 is used when the user switches the screen to the setting screen (screen 501) of the wireless network.

Description will now be given with reference to FIG. 5A again. A user who would like to perform the wireless network setting through the remote wireless setting method 2 or 3 according to a standard different from that of the setting method 1 selects the setting method 2 or 3 from the screen 501. Herein, it is assumed that the user has selected the setting method 2. If the setting method 2 is selected as an option, the MFP 101 shifts the screen displayed on the operation screen to a screen 503 illustrated in FIG. 5C. The screen 503 is a screen for details of the setting method 2, and information 531 necessary for connecting the communication terminal 102 to the software AP is displayed thereon.

The MFP 101 stops the software AP activated for the setting method 1 and activates the software AP according to the standard of the setting method 2. An exemplary embodiment will be described with respect to the case where a specification of the setting method 2 stipulates that the SSID should include an identifier "YY" at the head portion thereof and that communication should be performed without encryption. In this case, for example, the MFP 101 activates a software AP that does not require authentication of connection or encryption of communication through the SSID, for example, "YY-Printer". In addition, a stand-by screen (not illustrated) will be displayed when the software AP is being switched.

Figures 6, 6A:
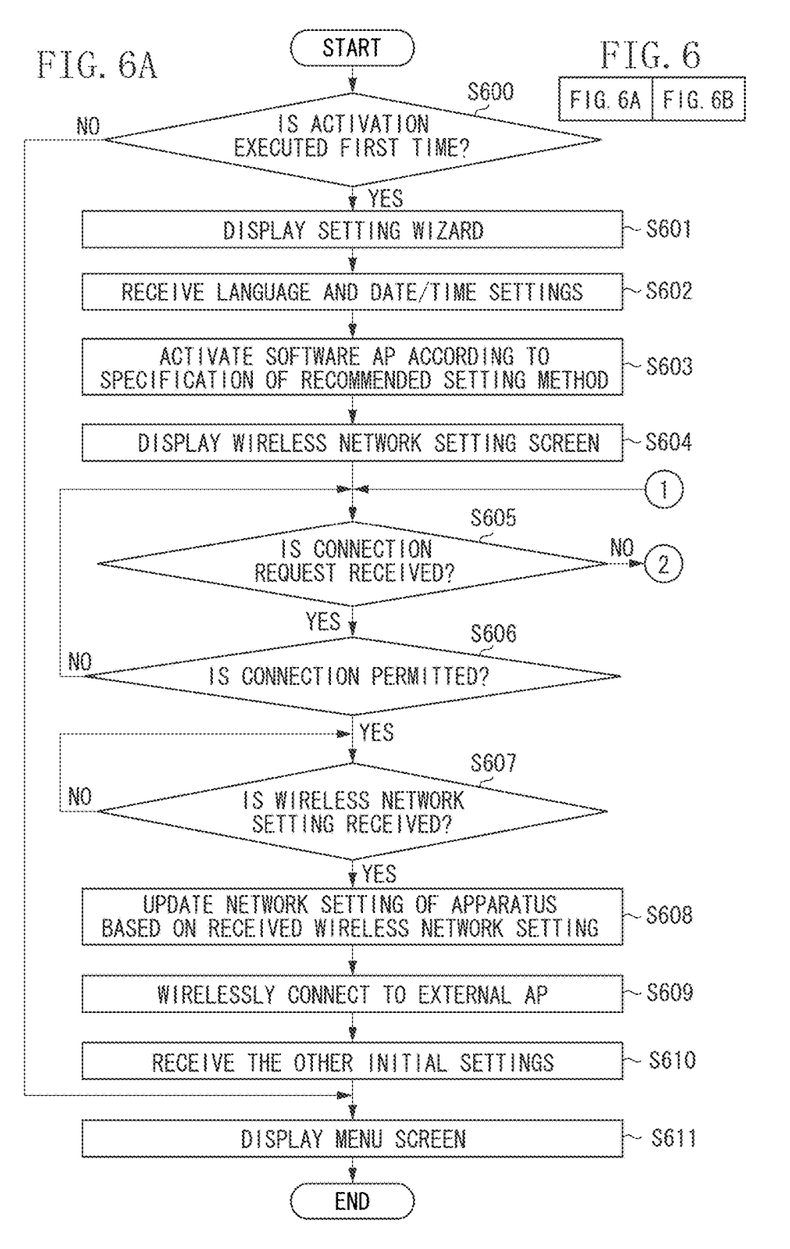
FIG. 6 is a diagram including flowcharts of FIGS. 6A and 6B illustrating control processing of the MFP.
Figure 6B:
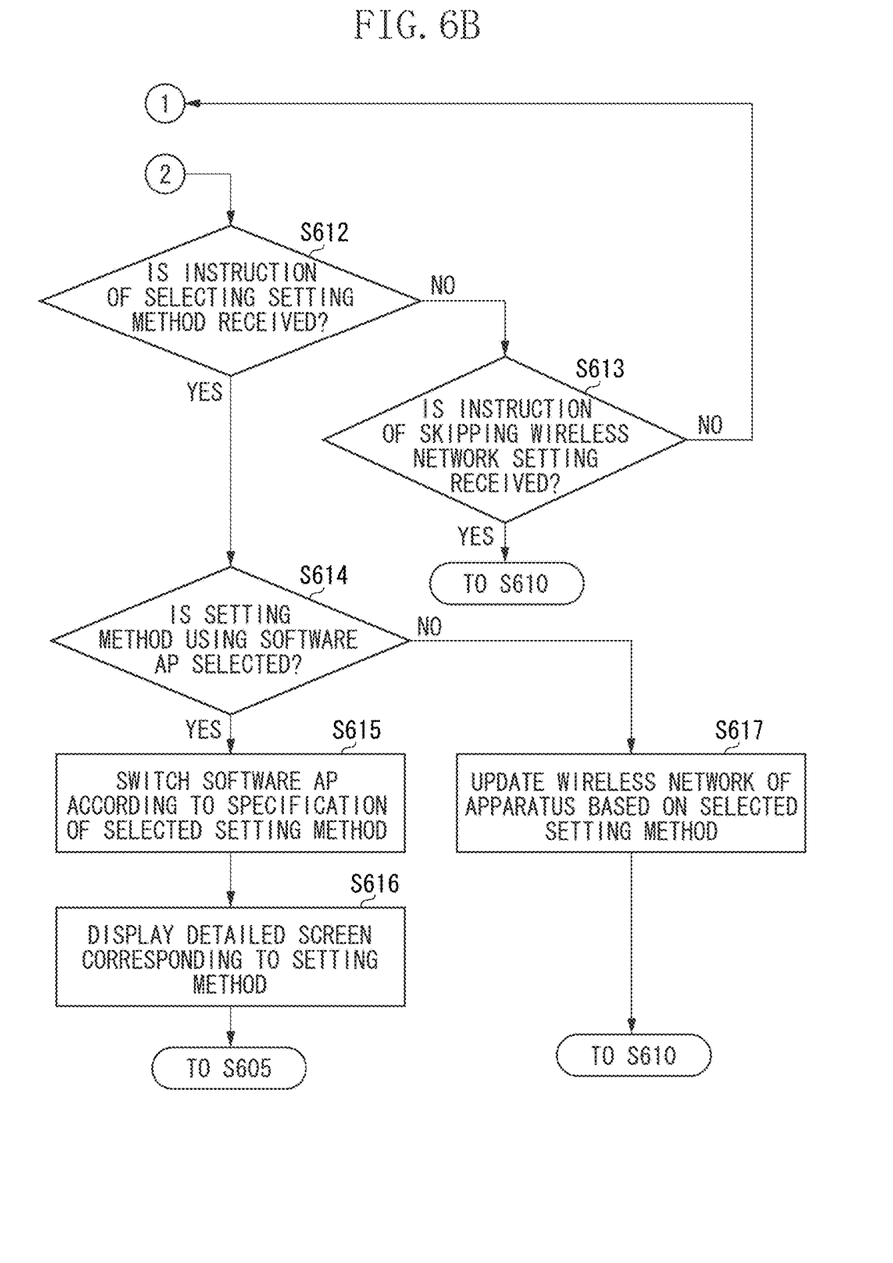

A specific control method of executing the initial setting of the MFP 101 will be described with reference to a flowchart in FIG. 6. The CPU 111 reads out a program for realizing control modules stored in the ROM 112 or the storage 114 to the RAM 113 and executes the program, so that each operation (step) illustrated in the flowchart in FIG. 6 is realized. The operations illustrated in the flowchart in FIG. 6 will be executed as activation processing when power is supplied to the MFP 101.

In step S600, the CPU 111 determines whether activation is executed for a first time after factory shipment. In a case where a reset flag as an internal setting of the MFP 101 is set to TRUE, the CPU 111 determines that activation is executed for a first time (YES in step S600), and the processing proceeds to step S601. In a case where the reset flag as the internal setting of the MFP 101 is not set to TRUE (i.e., FALSE), the CPU 111 determines that the activation is not executed for a first time (NO in step S600), and the processing proceeds to step S611. The reset flag is set to TRUE at the time of factory shipment. The reset flag is overwritten to TRUE when factory reset of the MFP 101 is executed.

In step S601, the CPU 111 displays a setting wizard screen on the operation unit 116. In step S602, the CPU 111 receives the display language setting and the date/time setting via the setting wizard screen. The received settings are stored in the storage 114 or the RAM 113 as the operation settings of the MFP 101.

In step S603, the CPU 111 activates the software AP according to a specification of the recommended setting method. The CPU 111 cooperates with the wireless LAN I/F 122 to activate the software AP at the setting of the SSID "XX-PrinterSetting1234" and the security key "1234". After the software AP is activated, the processing proceeds to step S604. In the present exemplary embodiment, while the remote wireless setting method 1 is described as the recommended setting method, the exemplary embodiment is not limited thereto. For example, the recommended setting method (specific setting method) can be set to be changeable. In this case, the recommended setting method can be flexibly changed at the time of factory shipment based on a change of the market trend. For example, in a case where a specific setting method has become popular because of competition for the market share of the Internet of Things (IoT) standard, the recommended setting method can be changed to that specific setting method at the time of factory shipment. At the time of factory shipment, the recommended setting method can be changed at each sales company responsible for selling the MFP or at each country as a sales destination.

In step S604, the CPU 111 displays the screen 501 for executing the wireless network setting on the operation unit 116. In step S605, the CPU 111 determines whether a connection request with respect to the software AP is received from the communication terminal 102. In a case where the connection request with respect to the software AP is received (YES in step S605), the processing proceeds to step S606. In a case where the connection request with respect to the software AP is not received (NO in step S605), the processing proceeds to step S612.

In step S606, the CPU 111 determines whether to permit authentication based on the received connection request. The CPU 111 executes authentication processing based on the received connection request. As a result of the authentication processing, in a case where connection to the software AP is permitted (YES in step S606), information indicating that authentication has succeeded is transmitted to the communication terminal 102, and the processing proceeds to step S607. As a result of the authentication processing, in a case where connection to the software AP is not permitted, the CPU 111 determines that the authentication is not permitted (NO in step S606). Therefore, the processing returns to step S605, and the CPU 111 waits for a retry of the connection request.

In step S607, the CPU 111 determines whether the wireless network setting is received from the communication terminal 102. In a case where the wireless network setting is received through direct wireless communication via the software AP (YES in step S607), the processing proceeds to step S608. In a case where the wireless network setting is not received through direct wireless communication via the software AP (NO in step S607), the CPU 111 enters a stand-by state and waits for the setting to be transmitted from the communication terminal 102.

In step S608, based on the wireless network setting received in step S607, the CPU 111 updates the wireless network setting as the operation setting of the MFP 101. The wireless network setting is stored in the storage 114 or the RAM 113. In the present exemplary embodiment, the wireless network setting transmitted from the communication terminal 102 is transmitted through a different port or a different communication protocol based on the setting method. Accordingly, it is possible to distinguish setting data of what setting method is received, so that the MFP 101 can execute processing based on the format thereof.

In step S609, the CPU 111 wirelessly connects to an external AP based on the wireless network setting stored in step S608. If the connection is permitted, the processing proceeds to step S610. If the connection is not permitted, the CPU 111 displays an error screen (not illustrated). When the CPU 111 receives a user instruction for skipping the wireless network setting via the error screen, the processing proceeds to step S610. If the CPU 111 receives a user instruction for retrying the connection via the error screen, the CPU 111 closes the error screen, and the processing returns to step S604.

In step S610, the CPU 111 receives another initial setting and stores the received initial setting as the setting of the MFP 101. For example, another setting information can be a time zone setting, a setting of printing calibration processing, or a setting of information about a location where the MFP 101 is installed. Description of functions (applications) included in the MFP 101 or a convenient use of the MFP 101 can be provided as the setting wizard. When the setting is completed, the setting wizard ends, and the processing proceeds to step S611. The CPU 111 overwrites the reset flag to FALSE when the setting wizard ends. Accordingly, when the MFP 101 is activated a first time after factory shipment, the setting wizard can be displayed.

In step S611, the CPU 111 displays a menu screen as an initial screen on the operation unit 116 and ends the series of activation processing. The menu screen displayed after completion of the activation processing is the initial screen displayed when the MFP 101 is to be used. The user can use various functions (a copying function and a transmission function) included in the MFP 101 via the menu screen. Various functions of the MFP 101 are usable when the series of activation processing is completed.

Next, the processing in step S612 and subsequent steps will be described. In step S612, the CPU 111 determines whether an instruction of selecting a setting method is received. In a case where an operation of selecting a setting method is received via a screen for receiving the wireless network setting (YES in step S612), the processing proceeds to step S614. In a case where an operation of selecting a setting method is not received (NO in step S612), the processing proceeds to step S613.

In step S613, the CPU 111 determines whether an instruction of skipping the wireless network setting is received. In a case where the instruction of skipping the wireless network setting is received (YES in step S613), the processing proceeds to step S610. In a case where the instruction of skipping the wireless network setting is not received (NO in step S613), the processing returns to step S605, and the CPU 111 waits for a connection request from the communication terminal 102 or a user operation performed through the operation unit 116.

In step S614, the CPU 111 determines whether the selected setting method is a setting method using a software AP. In a case where the selected setting method is a setting method using a software AP (YES in step S614), the processing proceeds to step S615. In a case where the selected setting method is not a setting method using a software AP (NO in step S614), the processing proceeds to step S617. In the present exemplary embodiment, the CPU 111 determines that the selected setting method is a setting method using a software AP if any one of the remote wireless setting methods 1 to 3 illustrated as the options 511 in FIG. 5A is selected. The CPU 111 determines that the selected setting method is not a setting method using a software AP if any one of the SSID setting, the WPS push-button method, or the WPS PIN code method illustrated as the options 510 in FIG. 5A is selected.

In step S615, the CPU 111 cooperates with the wireless LAN I/F 122 to switch the activated software AP to a software AP based on a specification of the selected setting method. Specifically, the CPU 111 executes stop processing of the activated software AP, and activates a software AP with an SSID and an encryption method based on the specification of the newly selected setting method. For example, if the setting method 2 is selected, the CPU 111 activates the software AP with a setting that does not require encryption through the SSID "YY-Printer". In addition, the CPU 111 displays a stand-by screen (not illustrated) on the operation unit 116 when the stop processing or the activation processing of the software AP is being executed.

In step S616, the CPU 111 displays a detailed screen corresponding to the setting method, and the processing proceeds to step S605. For example, if the setting method 2 is selected, a screen for details illustrated in FIG. 5C is displayed. In step S617, the CPU 111 updates the wireless network setting of the MFP 101 based on the selected setting method, and the processing proceeds to step S610.

As described above, in the present exemplary embodiment, it is possible to prompt a user to use a recommended setting method by preferentially activating an access point complying with the recommended setting method. Accordingly, in a case where the user uses the recommended setting method, a user operation can be simplified, so that the convenience of the user can be improved. The user can switch the setting method to another setting method through a user operation. Accordingly, the MFP 101 can flexibly support other setting methods. The MFP 101 can connect to the external AP 103 based on the wireless network setting received from the communication terminal 102 as the initial setting. Accordingly, the MFP 101 can receive, for example, print data from a communication terminal participating in the network of the AP 103 through infrastructure wireless communication. According to above described exemplary embodiments, the MFP 101 can operate a software AP by switching a setting method to a different setting method in a case where the user would like to use another setting method while prompting the user to execute setting through a predetermined setting method.

In the first exemplary embodiment, while a software AP based on a specification of the recommended setting method is activated at a timing of the processing in step S603, a timing of activating the software AP is not limited to the above. For example, the MFP 101 can activate the software AP at a timing of starting the setting wizard. In this case, through a status bar provided on a lower portion of the screen illustrated in FIG. 5A or 5B, the user can be notified that the remote wireless setting method 1 for executing the initial setting of the wireless network in cooperation with the communication terminal through direct wireless communication is usable. Notification about the wireless network setting displayed on the status bar is deleted if the wireless network setting is completed or the wireless network setting is skipped in the setting wizard.

In the present exemplary embodiment, while the software AP for the initial setting is operated continuously even if the series of activation processing illustrated in FIG. 6 has been completed, the exemplary embodiment is not limited thereto. For example, the software AP for the initial setting can be stopped at a timing of completing or skipping the wireless network setting, or at a timing of ending the setting wizard. At the above-described timing, the MFP 101 can switch the software AP for the initial setting to a general-purpose software AP for transmitting and receiving, for example, print data or image data, to/from the communication terminal 102 through direct wireless communication. In this case, the SSID is in a format having a character string, such as "DIRECT", at a head portion thereof, so that the software AP can be recognized as the software AP for direct wireless communication.

In the present exemplary embodiment, while the initial setting of the wireless network has been described as an example, the initial setting is not limited thereto. In addition to the initial setting of the wireless network, the setting method can include an initial setting, such as an account setting, for enabling the MFP 101 to cooperate with a cloud service.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-023622, filed Feb. 10, 2017, which is hereby incorporated by reference herein in its entirety.

What is claimed is:

1. An information processing apparatus comprising:
   an operation unit;
   one or more memory devices that store a set of instructions; and
   one or more processors that execute the set of instructions to perform operations including:
   activating a software access point that is used in a case of executing direct wireless communication with a communication terminal and is identified from an external apparatus by a predetermined service set identifier (SSID) that complies with a specific setting method among a plurality of setting methods when an initial setting of the information processing apparatus is executed, wherein the initial setting is executed upon condition that power is supplied to the information processing apparatus while the information processing apparatus is in a state of factory shipment, and
   activating a software access point that is used in a case of executing direct wireless communication with a communication terminal and is identified from an external apparatus by an SSID that is different from the predetermined SSID and complies with a setting method that is different from the specific setting method, based on a user operation for executing setting of the information processing apparatus through the setting method different from the specific setting method among the plurality of setting methods,
   wherein the user operation is received via the operation unit, and
   wherein a network setting used by the information processing apparatus is received from the communication terminal using the direct wireless communication via the activated software access point.

2. The information processing apparatus according to claim 1, wherein the setting received from the communication terminal includes at least an SSID for identifying an access point to which the information processing apparatus is intended to connect and a security key.

3. The information processing apparatus according to claim 2, wherein the setting received from the communication terminal includes a setting of a wired network.

4. The information processing apparatus according to claim 2, wherein the setting received from the communication terminal includes a setting of an account enabling the information processing apparatus to cooperate with a cloud service.

5. The information processing apparatus according to claim 1, wherein execution of the instructions by the one or more processors further performs operations including initializing a setting of the information processing apparatus to the state of factory shipment based on a user operation.

6. The information processing apparatus according to claim 1, wherein execution of the instructions by the one or more processors further performs operations including notifying a user of a setting method corresponding to an access point currently activated by the information processing apparatus.

7. The information processing apparatus according to claim 1, wherein execution of the instructions by the one or more processors further performs operations including stopping the access point being activated using the predetermined SSID and activating an access point of the SSID complying with the different setting method, based on a user operation for executing setting of the information processing apparatus by using a setting method different from the specific setting method.

8. The information processing apparatus according to claim 1, wherein execution of the instructions by the one or more processors further performs operations including executing control based on a different setting method upon condition that the information processing apparatus receives a user operation for executing setting of the information processing apparatus by using a setting method different from the specific setting method, the different setting method being a setting method of executing setting without using direct wireless communication.

9. The information processing apparatus according to claim 1, wherein execution of the instructions by the one or more processors further performs operations including:
    displaying, on the operation unit, a selection screen enabling a user to select a setting method from among the plurality of setting methods, and
    activating an access point using an SSID complying with a different setting method based on selection, performed via the selection screen, of a setting method different from the specific setting method.

10. The information processing apparatus according to claim 1 further comprising:
    a printing device configured to print an image on a sheet, wherein execution of the instructions by the one or more processors further performs operations including:
    receiving print data from an external apparatus, and
    printing an image based on the received print data on a sheet using the printing device.

11. A control method for controlling an information processing apparatus comprising:
    activating a software access point that is used in a case of executing direct wireless communication with a communication terminal and is identified from an external apparatus by a predetermined service set identifier (SSID) that complies with a specific setting method from among a plurality of setting methods when an initial setting of the information processing apparatus is executed, wherein the initial setting is executed upon condition that power is supplied to the information processing apparatus while the information processing apparatus is in a state of factory shipment;
    activating a software access point that is used in a case of executing direct wireless communication with a communication terminal and is identified from an external apparatus by an SSID that is different from the predetermined SSID and complies with a setting method that is different from the specific setting metting, based on a user operation, received via an operation unit, for executing setting of the information processing apparatus through the setting method different from the specific setting method among the plurality of setting methods; and
    receiving a network setting used by the information processing apparatus from the communication terminal using the direct wireless communication via the activated software access point.

12. The method according to claim 11, wherein the setting received from the communication terminal includes at least an SSID for identifying an access point to which the information processing apparatus is intended to connect and a security key.

13. The method according to claim 12, wherein the setting received from the communication terminal includes a setting of a wired network.

14. The method according to claim 12, wherein the setting received from the communication terminal includes a setting of an account enabling the information processing apparatus to cooperate with a cloud service.

15. The method according to claim 11, further comprising initializing a setting of the information processing apparatus to the state of factory shipment based on a user operation.

16. The method according to claim 11, further comprising notifying a user of a setting method corresponding to an access point currently activated by the information processing apparatus.

17. The method according to claim 11, further comprising stopping the access point being activated using the predetermined SSID and activating an access point of the SSID complying with the different setting method, based on a user operation for executing setting of the information processing apparatus by using a setting method different from the specific setting method.

18. The method according to claim 11, further comprising executing control based on a different setting method upon condition that the information processing apparatus receives a user operation for executing setting of the information processing apparatus by using a setting method different from the specific setting method, the different setting method being a setting method of executing setting without using direct wireless communication.

19. The method according to claim 11, further comprising displaying, on an operation unit, a selection screen, enabling a user to select a setting method from among the plurality of setting methods, and activating an access point using an SSID complying with a different setting method based on selection, performed via the selection screen, of a setting method different from the specific setting method.

20. The method according to claim 11, wherein the information processing apparatus includes a printing a printing device configured to print an image on a sheet, and the method further comprises
    receiving print data from an external apparatus, and
    printing an image based on the received print data on a sheet using the printing device.

21. A non-transitory computer-readable storage medium storing a program causing a computer to execute a method for controlling an information processing apparatus, the method comprising:

activating a software access point that is used in a case of executing direct wireless communication with a communication terminal and is identified from an external apparatus by a predetermined service set identifier (SSID) that complies with a specific setting method from among a plurality of setting methods when an initial setting of the information processing apparatus is executed, wherein the initial setting is executed upon condition that power is supplied to the information processing apparatus while the information processing apparatus is in a state of factory shipment;

activating a software access point that is used in a case of executing direct wireless communication with a communication terminal and is identified from an external apparatus by an SSID that is different from the predetermined SSID and complies with a setting method that is different from the specific setting metting, based on a user operation, received via an operation unit, for executing setting of the information processing apparatus through the setting method different from the specific setting method among the plurality of setting methods; and receiving a network setting used by the information processing apparatus from the communication terminal using the direct wireless communication via the activated software access point.

22. A control method for controlling an information processing apparatus comprising:

activating a software access point that is used in a case of executing direct wireless communication with a communication terminal and is identified from an external apparatus by a predetermined service set identifier (SSID) that complies with a specific setting method among a plurality of setting methods when a network setting of the information processing apparatus is executed, activating a software access point that is used in a case of executing direct wireless communication with a communication terminal and is identified from an external apparatus by an SSID that is different from the predetermined SSID and complies with a setting method that is different from the specific setting method, based on a user operation for executing setting of the information processing apparatus through the setting method different from the specific setting method among the plurality of setting methods, wherein the user operation is received via an operation unit, and wherein a network setting used by the information processing apparatus is received from the communication terminal using via the direct wireless communication via the activated software access point.

* * * * *